Aug. 13, 1968  C. R. SAKRAIDA ET AL  3,396,712
COVER SEAL ARRANGEMENT
Filed May 29, 1967
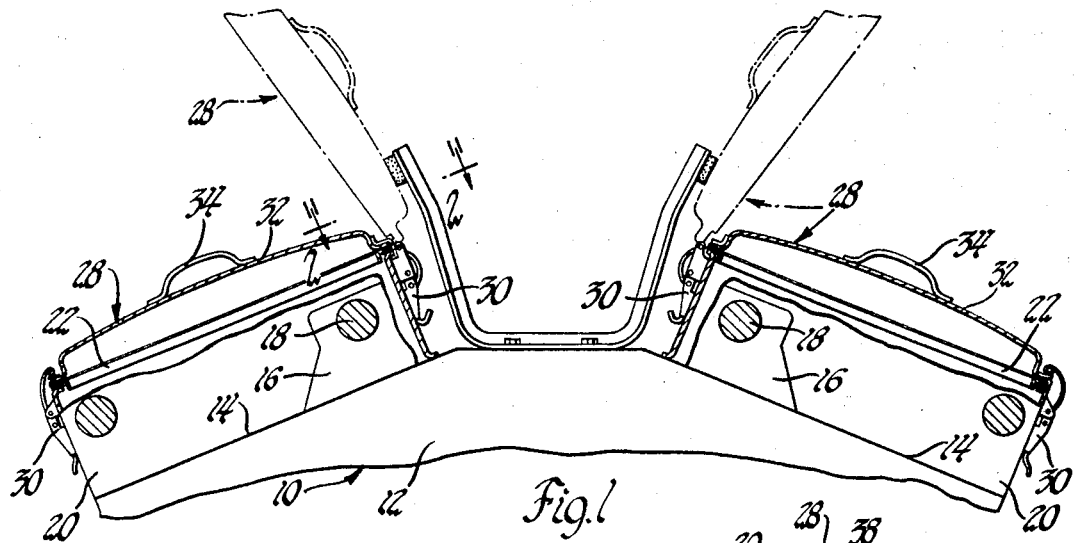
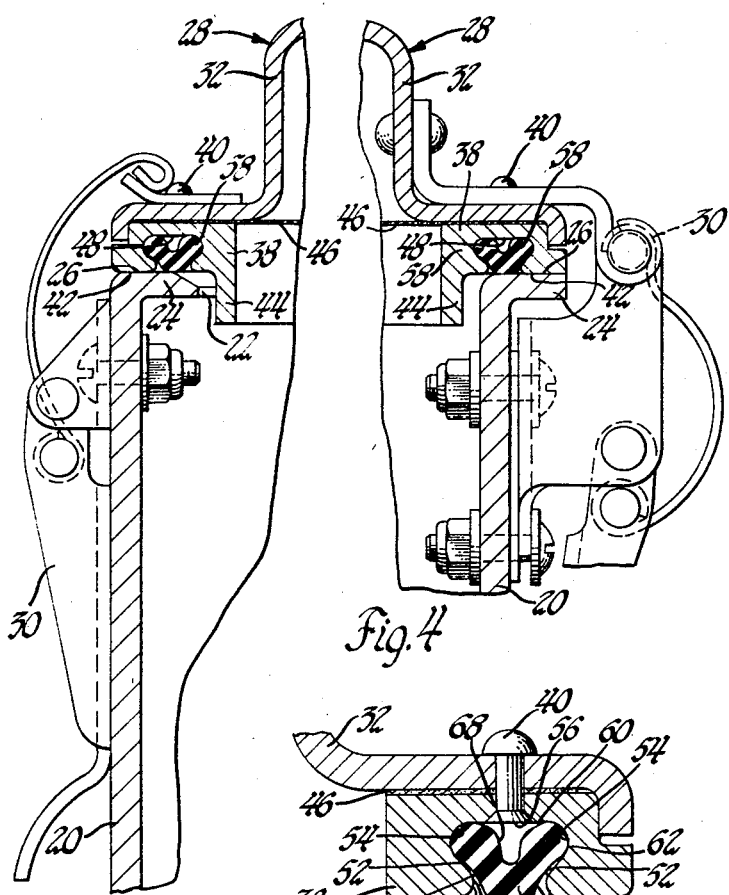
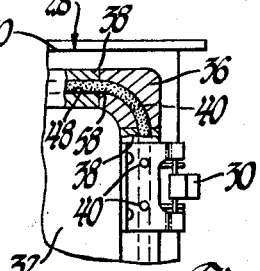
Fig. 2
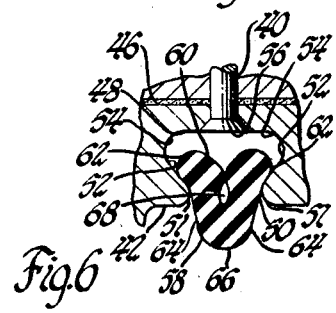
Fig. 6
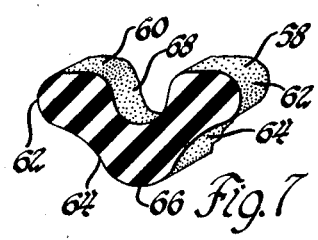
Fig. 7
INVENTORS
Carl R. Sakraida, &
Thomas N. Pratt
Robert J. Outland
ATTORNEY United States Patent Office 3,396,712
Patented Aug. 13, 1968

3,396,712
COVER SEAL ARRANGEMENT
Carl R. Sakraida, Naperville, and Thomas N. Pratt, Oak Park, Ill., assignors to General Motors Corporation, Detroit, Mich., a corporation of Delaware
Filed May 29, 1967, Ser. No. 641,886
6 Claims. (Cl. 123—198)

ABSTRACT OF THE DISCLOSURE

A removable cylinder head cover includes peripheral seal retaining means having a splash lip and a seal retaining groove receiving a resilient seal, the groove and seal being shaped to provide improved sealing ability with low seal compression combined with good retention of the seal in the groove.

This invention relates to cover sealing arrangements and more particularly to a removable cover for sealing the opening of a lubricant containing machinery compartment, such as the cylinder head cover of an internal combustion engine.

It is well known to provide suitable covers for machinery compartments in which lubricating oil is present in order to prevent the escape of oil vapors and droplets to the exterior of the compartment when the machinery is in operation. It is also common to make such covers capable of being opened or removed in order to utilize the openings for inspection or adjustment of the machinery. One such arrangement for covering the cylinder heads of an internal combustion engine is shown in United States Patent No. 2,724,378, entitled "Safety Cover Means for Internal Combustion Engines."

The present invention involves certain improvements in sealing arrangements and construction of cover means of the type disclosed in the above-mentioned patent as well as improvements in seal construction which are generally applicable to many types of closure members.

Prior cover sealing arrangements have in some cases failed to permit adequate compensation for dimensional variations in manufacturing. This has sometimes resulted in leakage due either to undercompression of the seal or excessive set and hardening of the seal caused in part by its overcompression. Also, tacky oil deposits have occasionally pulled a seal from its groove upon opening of the cover.

The present invention has reduced these problems by providing a seal arrangement which combines characteristics of compression and resilient bending of the seal to give increased dimensional tolerances, better sealing ability and better retention of the seal in its groove while requiring less compression of the seal when the cover is in the closed position.

These and other advantages will be more apparent from the following description of a preferred embodiment of the invention chosen for purposes of illustration and in which, referring to the drawings:

FIGURE 1 is a fragmentary end elevation partially in section and showing an engine having cylinder head covers according to the invention;

FIGURE 2 is a fragmentary top view of the engine as viewed in the direction of arrows 2—2 of FIGURE 1;

FIGURE 3 is an enlarged cross-sectional view of a portion of FIGURE 1 showing a part of the cover seal arrangement;

FIGURE 4 is an enlarged cross-sectional view of another portion of FIGURE 1 showing another part of the cover seal arrangement;

FIGURE 5 is an enlarged cross-sectional view of a portion of the cover seal assembly showing its appearance with the cover in the open position;

FIGURE 6 is an enlarged cross-sectional view similar to FIGURE 4 but showing the position of the seal upon attempted removal from the groove; and FIGURE 7 is a pictorial cross-sectional view of a resilient seal according to the invention shown in its free, unrestrained state.

In the drawings, numeral 10 generally indicates an internal combustion engine of the general type disclosed in the above-mentioned United States Patent No. 2,724,378. The engine includes a frame 12 having upper deck plates 14 on which are mounted supports 16. The supports 16 rotatably journal camshafts 18 which are arranged to operate rocker arm mechanisms so as to actuate valves and fuel injectors located in the engine cylinder heads (not shown).

Also mounted on the upper deck plates 14 are cylinder head housings or frames 20, the upper portions of which include rectangular openings 22 through which inspection and work on the cylinder heads and upper deck mechanism is accomplished. The cylinder head frames include flanges 24 or other members (not shown) to provide a planar sealing surface 26 surrounding each opening.

Openings 22 are closed by covers generally indicated by numeral 28. The covers are removably retained in place by holddown means 30 of the type disclosed in the previously mentioned United States Patent No. 2,724,378.

Each of the covers 28 includes a sheet metal body 32 preferably formed of stamped aluminum for light weight and having handles 34 for grasping the covers to open and remove them. Around the periphery of each cover are retained seal retaining means which include individual corner sections 36 abutting separate side sections 38 which extend along the straight sides of the covers intermediate the corner portions. Corner sections 36 preferably comprise aluminum castings, while side sections 38 comprise straight aluminum extrusions. Both side and corner sections are secured to the sheet metal main body by means of rivets 40 or other suitable fasteners and include a flat surface 42 which engages sealing surface 26 of the respective cylinder head frame. At the inner edge of surface 42 is a depending lip 44 which extends into the opening 22 to prevent excessive oil splash from reaching the joint between surfaces 26 and 42. An adhesive sealing material 46, or other suitable sealing means, is preferably utilized between the seal retaining means sections 36, 38 and the main body 28 to prevent leakage of oil through the joint.

Opening through surface 42 intermediate its edges is a continuous seal groove 48 which includes straight portions in side sections 38 aligned with curved portions in corner sections 36. Groove 48 includes a relatively narrow mouth 50 having radiused edges 51 connected by acutely angled sides 52 and generous radii 54 with a flat base 56. Sides 52 form acute angles of approximately 45° with surface 42 and the groove depth is approximately equal to the width of the groove mouth.

Disposed within the seal groove and engaging sealing surface 26 is a seal 58 formed of a suitable resilient heat and oil resistant elastomeric material such as a polyacrylic synthetic or silicon rubber material. Seal 58, in its free state (FIGURE 7), has a modified triangular shape having a relatively flat top side 60 connected by radiused corners 62 with slightly concave sides 64 which are equiangularly disposed with respect to top side 60 at acute angles somewhat less than 45°. Sides 64 terminate in a rounded sealing edge 66. A U-shaped groove or recess 68 extends along the top side of the seal opposite the sealing edge 66 and extends downwardly about halfway between side 60 and edge 66.

For reasons to be discussed subsequently, the seal height in the free state must be at least approximately equal to the depth of groove 48 and is preferably slightly higher, the free width of the seal is slightly greater than the width of groove 48 at its maximum point and the width of the U-shaped recess is substantially less than and preferably about half the width of the groove mouth.

As the seal is installed in the groove with the cover in the open position (FIGURE 5), the radiused corners 62 of the seal engage radii 54 of the groove so that the sides of the seal are deformed inwardly slightly flexing the seal around its center and narrowing slightly the width of groove 68. This changes the angle of the sides 64 slightly so as to increase the height of the seal and assures (assuming free seal height at least equal to groove depth) that the rounded sealing edge 66 will extend substantially through the mouth 50 of the groove. Thus, when the cover is closed (FIGURES 3 and 4) sealing edge 66 engages sealing surface 26 of the cover frame placing the seal in compression and at the same time forcing it upwardly to push top side 60 against groove base 56, thus spreading the compression forces over the periphery of the seal. This permits a greater sealing force to be exerted without the same degree of local compression of the seals, which was necessary in previous designs, and thus reduces the amount of compression set occurring when the seal is used.

If upon opening of the cover, the seal tends to stick on surface 42 due to tacky oil deposits, or for other reasons, a force is created tending to pull the seal out of its retaining groove 48. This causes the seal to pull downwardly, as shown in FIGURE 6, squeezing the sides inwardly until the sides of groove 68 contact one another. At this point substantial compression of the upper portions of the seal is necessary in order to pull the seal further downwardly and this provides an effective restraint to forces acting to remove the seal from the groove when such removal is not desired.

While the present invention has been described by reference to a specific embodiment thereof chosen for purposes of illustration, it is apparent that numerous changes could be made within the scope of the invention and, accordingly, it is desired that the invention not be limited except by the language of the following claims.

We claim:

1. A removable cover for closing a compartment having an opening and a generally planar sealing surface surrounding said opening, said cover including:
    seal retaining means along the periphery of said cover and having a flat surface adapted to seat against the compartment sealing surface, said means including a seal groove opening to said flat surface and having a narrow mouth having radiused edges connected by acutely angled sides and generous radii to a flat base substantially wider than said mouth; and
    a strip seal in said groove, said seal being of modified triangular cross-section having a top side and a U-shaped recess centrally located along the top side facing the base of said groove as installed, said top side converging at radiused corners with a pair of equiangularly disposed sides generally conforming to the angled sides of said groove and joined by a rounded edge lying opposite said recess and extending through said groove mouth to engage the compartment sealing surface when said cover is in closed position, said seal being formed of resilient material and being dimensioned in its free state such that the seal height is at least equal to the depth of said groove, the seal width is at least slightly greater than the maximum width of said groove, the recess extends downwardly a substantial portion of the seal height and the recess width is substantially less than the difference between the free seal width of the groove mouth.

2. The cover of claim 1 wherein said seal groove height is approximately equal to the width of said groove mouth and the angle of said groove sides to one another is approximately 90° and to said base is approximately 45°.

3. A rectangular removable sheet metal cover for closing an oil containing machinery compartment having a rectangular opening and a generally planar sealing surface surrounding said opening, said cover including:
    seal retaining means secured along the periphery of said cover, said seal retaining means having a flat surface adapted to seat against the compartment sealing surface and a seal groove opening to said flat surface and having a narrow mouth having radiused edges connected by acutely angled sides and generous radii to a flat base substantially wider than said mouth, said retaining means including individual corner sections having curved groove portions and located at the corners of said cover and separate side sections having straight groove portions and located along the sides of the cover abutting said corner sections to form a continuous groove around the periphery of said cover; and
    a strip seal in said groove, said seal being of modified triangular cross-section having a top side and a U-shaped recess centrally located along the top side facing the base of said groove as installed, said top side converging at radiused corners with a pair of equiangularly disposed sides generally conforming to the angled sides of said groove and joined by a rounded edge lying opposite said recess and extending through said groove mouth to engage the compartment sealing surface when said cover is in closed position, said seal being formed of an oil resistant resilient material and being dimensioned in its free state such that the seal height is at least equal the depth of said groove, the seal width is at least slightly greater than the maximum width of said groove, the recess extends downwardly a substantial portion of the seal height and the recess width is substantially less than the difference between the free seal width and the width of the groove mouth.

4. The cover of claim 3 wherein said seal retaining means are secured to said cover by suitable fasteners extending through the cover and the various retaining means sections and the joint between the retaining means and the cover is sealed with an adhesive material to prevent leakage of oil therethrough, said retaining means including a continuous depending lip inwardly of said seal groove and adapted to extend into the compartment opening when the cover is closed to prevent excessive oil splash against the sealed joint.

5. The cover of claim 4 wherein said retaining means side sections comprise extruded aluminum members and said corner sections comprise cast aluminum members.

6. The cover of claim 5 wherein said retaining means groove height is approximately equal to the width of said groove mouth and the angle of said groove sides to one another is approximately 90° and to said base is approximately 45°.

(References on following page)

References Cited

UNITED STATES PATENTS

| | | | |
|---|---|---|---|
| 1,192,361 | 7/1916 | Wistrom | 49—499 |
| 1,560,097 | 11/1925 | Petersen | 49—499 |
| 1,998,791 | 4/1935 | Schanz | 49—489 |
| 2,654,921 | 10/1953 | Blanchard | 49—489 |
| 2,676,559 | 4/1953 | Davies | 123—198 |
| 2,724,378 | 11/1955 | Wellman | 123—198 |
| 2,757,422 | 8/1956 | Flicker | 49—489 |
| 3,140,517 | 7/1964 | Richter | 49—489 |

FOREIGN PATENTS

| | | |
|---|---|---|
| 508,504 | 2/1952 | Belgium. |
| 1,006,960 | 10/1965 | Great Britain. |
| 1,220,078 | 1/1960 | France. |

WENDELL E. BURNS, *Primary Examiner.*

UNITED STATES PATENT OFFICE
CERTIFICATE OF CORRECTION

Patent No. 3,396,712                                                  August 13, 1968

Carl R. Sakraida et al.

It is certified that error appears in the above identified patent and that said Letters Patent are hereby corrected as shown below:

Column 4, line 13, after "width" insert -- and width --.

Signed and sealed this 30th day of December 1969.

(SEAL)
Attest:

Edward M. Fletcher, Jr.                              WILLIAM E. SCHUYLER, JR.
Attesting Officer                                                    Commissioner of Patents